United States Patent
Buehler (10) Patent No.: US 7,286,157 B2
(45) Date of Patent: Oct. 23, 2007

(54) COMPUTERIZED METHOD AND APPARATUS FOR DETERMINING FIELD-OF-VIEW RELATIONSHIPS AMONG MULTIPLE IMAGE SENSORS

(75) Inventor: Christopher J. Buehler, Cambridge, MA (US)

(73) Assignee: Intellivid Corporation, Cambridge, MA (US)

( * ) Notice: Subject to any disclaimer, the term of this patent is extended or adjusted under 35 U.S.C. 154(b) by 839 days.

(21) Appl. No.: 10/660,955

(22) Filed: Sep. 11, 2003

(65) Prior Publication Data

US 2005/0058321 A1    Mar. 17, 2005

(51) Int. Cl.
  *H04N 7/18*  (2006.01)
  *G06K 9/00*  (2006.01)
(52) U.S. Cl. ........................ 348/143; 382/100
(58) Field of Classification Search ........... 348/143, 348/411, 153, 161, 135; 382/100, 103, 246, 382/278
  See application file for complete search history.

(56) References Cited

U.S. PATENT DOCUMENTS

| | | | |
|---|---|---|---|
| 3,740,466 A | 6/1973 | Marshall et al. | 178/6.8 |
| 4,511,886 A | 4/1985 | Rodriguez | 340/534 |
| 4,737,847 A | 4/1988 | Araki et al. | 358/108 |
| 4,739,401 A * | 4/1988 | Sacks et al. | 382/103 |
| 5,097,328 A | 3/1992 | Boyette | 358/108 |
| 5,164,827 A | 11/1992 | Paff | 358/108 |
| 5,179,441 A | 1/1993 | Anderson et al. | 358/88 |
| 5,216,502 A | 6/1993 | Katz | 358/108 |
| 5,237,408 A | 8/1993 | Blum et al. | 358/108 |
| 5,243,418 A | 9/1993 | Kuno et al. | 358/108 |
| 5,298,697 A | 3/1994 | Suzuki et al. | 187/131 |
| 5,305,390 A | 4/1994 | Frey et al. | 382/2 |
| 5,317,394 A | 5/1994 | Hale et al. | 348/208 |
| 5,581,625 A | 12/1996 | Connell | 382/1 |
| 5,666,157 A | 9/1997 | Aviv | 348/152 |

(Continued)

FOREIGN PATENT DOCUMENTS

EP    0 529 317 A1    3/1993

(Continued)

OTHER PUBLICATIONS

Chang et al., "Tracking Multiple People with a Multi-Camera System," *IEEE*, 19-26 (2001).

(Continued)

*Primary Examiner*—Gims Philippe
(74) *Attorney, Agent, or Firm*—Goodwin Procter LLP (57) ABSTRACT

A computerized method of image analysis that includes receiving first image data for a plurality of first video frames representing a first scene. Each first video frame is composed of a plurality of image regions, and a first object is present in an image region of at least one first video frame. Second image data is received for a plurality of second video frames representing a second scene. Each second video frame is composed of a plurality of image regions, and a second object is present in an image region of at least one second video frame. The method also includes determining a relationship between a first image region and a second image region based on a probabilistic correlation between occurrences of the first object being present in the first image region and occurrences of the second object being present in the second image region.

48 Claims, 9 Drawing Sheets

U.S. PATENT DOCUMENTS

| | | | | |
|---|---|---|---|---|
| 5,699,444 | A | 12/1997 | Palm | 382/106 |
| 5,729,471 | A | 3/1998 | Jain et al. | 364/514 |
| 5,734,737 | A | 3/1998 | Chang et al. | 382/107 |
| 5,745,126 | A | 4/1998 | Jain et al. | 345/952 |
| 5,920,338 | A | 7/1999 | Katz | 348/150 |
| 5,956,081 | A | 9/1999 | Katz et al. | 348/163 |
| 5,969,755 | A | 10/1999 | Courtney | 348/143 |
| 5,973,732 | A | 10/1999 | Guthrie | 348/169 |
| 6,002,995 | A | 12/1999 | Suzuki et al. | 702/188 |
| 6,028,626 | A | 2/2000 | Aviv | 348/152 |
| 6,049,363 | A | 4/2000 | Courtney et al. | 348/700 |
| 6,061,088 | A | 5/2000 | Khosravi et al. | 348/169 |
| 6,069,655 | A | 5/2000 | Seeley et al. | 348/154 |
| 6,075,560 | A | 6/2000 | Katz | 348/150 |
| 6,097,429 | A | 8/2000 | Seeley et al. | 348/154 |
| 6,185,314 | B1 | 2/2001 | Crabtree et al. | 382/103 |
| 6,188,777 | B1 | 2/2001 | Darrell et al. | 382/103 |
| 6,237,647 | B1 | 5/2001 | Pong et al. | 141/94 |
| 6,285,746 | B1 | 9/2001 | Duran et al. | 379/93.21 |
| 6,295,367 | B1 | 9/2001 | Crabtree et al. | 382/103 |
| 6,359,647 | B1 | 3/2002 | Sengupta et al. | 348/154 |
| 6,396,535 | B1 | 5/2002 | Waters | 348/159 |
| 6,400,830 | B1 | 6/2002 | Christian et al. | 382/103 |
| 6,400,831 | B2 | 6/2002 | Lee et al. | 382/103 |
| 6,437,819 | B1 | 8/2002 | Loveland | 348/143 |
| 6,442,476 | B1 | 8/2002 | Poropat | 701/207 |
| 6,456,320 | B2 | 9/2002 | Kuwano et al. | 348/143 |
| 6,456,730 | B1 | 9/2002 | Taniguchi | 382/107 |
| 6,483,935 | B1 | 11/2002 | Rostami et al. | 382/141 |
| 6,502,082 | B1 | 12/2002 | Toyama et al. | 706/16 |
| 6,516,090 | B1 | 2/2003 | Lennon et al. | 382/173 |
| 6,522,787 | B1 | 2/2003 | Kumar et al. | 382/268 |
| 6,526,156 | B1 | 2/2003 | Black et al. | 382/103 |
| 6,549,643 | B1 | 4/2003 | Toklu et al. | 382/107 |
| 6,549,660 | B1 | 4/2003 | Lipson et al. | 382/224 |
| 6,574,353 | B1 | 6/2003 | Schoepflin et al. | 382/103 |
| 6,580,821 | B1 | 6/2003 | Roy | 382/154 |
| 6,591,005 | B1 | 7/2003 | Gallagher | 382/154 |
| 6,668,094 | B1 * | 12/2003 | Yoo et al. | 382/246 |
| 6,687,416 | B2 * | 2/2004 | Wang | 382/278 |
| 6,698,021 | B1 | 2/2004 | Amini et al. | 725/105 |
| 6,791,603 | B2 | 9/2004 | Lazo et al. | 348/169 |
| 6,798,445 | B1 | 9/2004 | Brummitt et al. | 348/207.11 |
| 6,813,372 | B2 | 11/2004 | Stanbridge et al. | 382/107 |
| 7,095,873 | B2 * | 8/2006 | Venkatesan et al. | 382/100 |
| 2001/0032118 | A1 | 10/2001 | Carter | 705/11 |
| 2003/0025800 | A1 | 2/2003 | Hunter et al. | 348/208.13 |
| 2003/0040815 | A1 | 2/2003 | Pavlidis | 700/48 |
| 2003/0053658 | A1 | 3/2003 | Pavlidis | 382/103 |
| 2003/0058111 | A1 | 3/2003 | Lee et al. | 340/573.1 |
| 2003/0058237 | A1 | 3/2003 | Lee | 345/418 |
| 2003/0058341 | A1 | 3/2003 | Brodsky et al. | 348/169 |
| 2003/0058342 | A1 | 3/2003 | Trajkovic | 348/207.1 |
| 2003/0071891 | A1 | 4/2003 | Geng | 348/39 |
| 2003/0103139 | A1 | 6/2003 | Pretzer et al. | 348/143 |
| 2003/0123703 | A1 | 7/2003 | Pavlidis et al. | 382/103 |
| 2003/0197612 | A1 | 10/2003 | Tanaka et al. | 340/572.1 |
| 2004/0130620 | A1 | 7/2004 | Buehler et al. | 348/143 |
| 2004/0155960 | A1 | 8/2004 | Wren et al. | 348/150 |
| 2004/0160317 | A1 | 8/2004 | McKeown et al. | 340/522 |
| 2004/0164858 | A1 | 8/2004 | Lin | 340/522 |
| 2004/0252197 | A1 | 12/2004 | Fraley et al. | 348/207.1 |
| 2005/0017071 | A1 | 1/2005 | Noonan | 235/385 |
| 2005/0073418 | A1 | 4/2005 | Kelliher et al. | 340/572.1 |
| 2005/0078006 | A1 | 4/2005 | Hutchins et al. | 340/561 |
| 2005/0102183 | A1 | 5/2005 | Kelliher et al. | 705/16 |

FOREIGN PATENT DOCUMENTS

| | | |
|---|---|---|
| EP | 0 714 081 A1 | 5/1996 |
| EP | 0 967 584 A2 | 12/1999 |
| EP | 1189187 A2 | 3/2002 |
| JP | 8011071 | 1/1996 |
| WO | 97/04428 | 2/1997 |
| WO | 01/82626 A1 | 11/2001 |

OTHER PUBLICATIONS

International Search Report for International Application No. PCT/US03/35943 dated Apr. 13, 2004.

Khan et al., "Human Tracking in Multiple Cameras," *IEEE*, 331-336 (2001).

International Search Report for PCT/US04/033168 dated Feb. 25, 2005.

Written Opinion of the Internation Searching Authority for PCT/US04/033168 dated Feb. 25, 2005.

International Search Report for PCT/US04/29418 dated Feb. 28, 2005.

Written Opinion of the Internation Searching Authority for PCT/US04/29418 dated Feb. 25, 2005

International Search Report for PCT/US04/29417 dated Mar. 18, 2005.

Written Opinion of the International Searching Authority for PCT/US04/29417.

International Search Report for PCT/US2004/033177 dated Dec. 12, 2005.

Written Opinion for PCT/US2004/033177.

International Preliminary Report on Patentability for PCT/US2004/029417 dated Mar. 13, 2006.

International Preliminary Report on Patentability for PCT/US2004/033177 dated Apr. 10, 2006.

International Preliminary Report on Patentability for PCT/US2004/033168 dated Apr. 10, 2006.

Author unknown. "The Future of Security Systems" retreived from the internet on May 24, 2005, http://www.activeye.com/; http://www.activeye.com/act_alert.htm; http://www.activeye.com/tech.htm; http://www.activeye.com/ae_team.htm; 7 pgs.

* cited by examiner

| | Image Region (i) | Current $X_i$ | $S_i$ |
|---|---|---|---|
| Camera 1 | 1, 1 (1) | 0 | 253 |
| | 2, 1 (2) | 1 | 380 |
| | 1, 2 (3) | 0 | 106 |
| | 2, 2 (4) | 1 | 300 |

601

| | Image Region (i) | Current $X_i$ | $S_i$ |
|---|---|---|---|
| Camera 2 | 1, 1 (5) | 1 | 400 |
| | 2, 1 (6) | 0 | 35 |
| | 1, 2 (7) | 0 | 170 |
| | 2, 2 (8) | 0 | 12 |

| HISTORY TABLE | |
|---|---|
| Prior frame T= | Objects present in |
| 0 | 2, 4, 5 |
| 1 | 3, 6 |
| 2 | 1, 8 |
| 3 | 2, |
| 4 | 3 |
| 5 | 1, 2 |
| 6 | 4, 7 |
| 7 | 2, 4, 5 |
| 8 | 1 |
| 9 | 6, 7 |

|   |     | Image region *j* |     |     |     |     |     |     |     |
|---|-----|---|---|---|---|---|---|---|---|
| N=500 |   | 1 | 2 | 3 | 4 | 5 | 6 | 7 | 8 |
|   | T=0 | 188 | 265 | 483 | 491 | 371 | 362 | 340 | 482 |
| 1 | T=1 | 390 | 134 | 290 | 375 | 27 | 301 | 389 | 464 |
|   | T=2 | 239 | 25 | 157 | 459 | 174 | 444 | 375 | 179 |
|   | T=0 | 265 | 451 | 187 | 419 | 244 | 259 | 139 | 145 |
| 2 | T=1 | 376 | 151 | 143 | 408 | 350 | 128 | 289 | 362 |
|   | T=2 | 412 | 160 | 301 | 442 | 107 | 479 | 220 | 237 |
|   | T=0 | 483 | 187 | 350 | 144 | 139 | 199 | 216 | 440 |
| 3 | T=1 | 224 | 453 | 258 | 401 | 218 | 392 | 495 | 437 |
|   | T=2 | 250 | 210 | 376 | 221 | 499 | 453 | 188 | 179 |
|   | T=0 | 491 | 419 | 144 | 100 | 234 | 175 | 296 | 203 |
| 4 | T=1 | 151 | 166 | 430 | 398 | 269 | 416 | 243 | 363 |
|   | T=2 | 142 | 446 | 402 | 468 | 469 | 201 | 282 | 285 |
|   | T=0 | 371 | 244 | 139 | 234 | 321 | 159 | 291 | 204 |
| 5 | T=1 | 212 | 253 | 326 | 398 | 308 | 191 | 396 | 125 |
|   | T=2 | 152 | 234 | 295 | 389 | 297 | 123 | 122 | 243 |
|   | T=0 | 362 | 259 | 199 | 175 | 159 | 255 | 383 | 195 |
| 6 | T=1 | 140 | 413 | 293 | 108 | 246 | 456 | 379 | 498 |
|   | T=2 | 495 | 385 | 141 | 222 | 435 | 354 | 342 | 242 |
|   | T=0 | 340 | 139 | 216 | 296 | 291 | 383 | 439 | 127 |
| 7 | T=1 | 199 | 442 | 460 | 329 | 212 | 132 | 310 | 247 |
|   | T=2 | 173 | 443 | 486 | 214 | 265 | 483 | 328 | 370 |
|   | T=0 | 482 | 145 | 440 | 203 | 204 | 195 | 127 | 462 |
| 8 | T=1 | 425 | 439 | 189 | 357 | 306 | 259 | 333 | 306 |
|   | T=2 | 249 | 384 | 146 | 356 | 393 | 260 | 188 | 462 |

COMPUTERIZED METHOD AND APPARATUS FOR DETERMINING FIELD-OF-VIEW RELATIONSHIPS AMONG MULTIPLE IMAGE SENSORS

TECHNICAL FIELD

The present invention generally relates to video surveillance, and more specifically to a computer aided surveillance system for determining relationships between image sensor fields-of-view.

BACKGROUND

The current heightened sense of security and declining cost of camera equipment have resulted in increased use of closed circuit television (CCTV) surveillance systems. Such systems have the potential to reduce crime, prevent accidents, and generally increase security in a wide variety of environments.

A simple closed-circuit television system uses a single camera connected to a display device. More complex systems can have multiple cameras and/or multiple displays. One known type of system is the security display in a retail store, which switches periodically between different cameras to provide different views of the store. Higher security installations, such as prisons and military installations, use a bank of video displays each displaying the output of an associated camera. A guard or human attendant constantly watches the various screens looking for suspicious activity.

More recently, inexpensive digital cameras have become popular for security and other applications. In addition, it is now possible to use a web cam to monitor a remote location. Web cams typically have relatively slow frame rates, but are sufficient for some security applications. Inexpensive cameras that transmit signals wirelessly to remotely located computers or other displays are also used to provide video surveillance.

As the number of cameras increases, the amount of raw information that needs to be processed and analyzed also increases. Computer technology can be used to alleviate this raw data processing task, resulting in a new breed of information technology device—the computer-aided surveillance (CAS) system. Computer-aided surveillance technology has been developed for various applications. For example, the military has used computer-aided image processing to provide automated targeting and other assistance to fighter pilots and other personnel. In addition, computer-aided surveillance has been applied to monitor activity in swimming pools.

A CAS system automatically monitors objects (e.g., people, inventory, etc.) as they appear in series of surveillance video frames. One particularly useful monitoring task is tracking the movements of objects in a monitored area. Methods for tracking objects, such as people, moving through an image are known in the art. To achieve more accurate tracking information, the CAS system can utilize knowledge about the basic elements of the images depicted in the series of surveillance video frames.

On a macroscopic level, a video surveillance frame depicts an image of a scene in which people and things move and interact. On a microscopic level, a video frame is composed of a plurality of pixels, often arranged in a grid-like fashion. The number of pixels in an image depends on several factors including the resolution of the camera generating the image, the display on which the image is presented, the capacity of the storage device on which the images are stored, etc. Analysis of a video frame can be conducted either at the pixel level or at the (pixel) group level depending on the processing capability and the desired level of precision. A pixel or group of pixels being analyzed is referred to herein as an "image region."

Image regions can be categorized as depicting part of the background of the scene or as depicting a foreground object. In general, the background remains relatively static in each frame. However, objects are depicted in different image regions in different frames. Several methods for separating objects in a video frame from the background of the frame, referred to as object extraction, are known in the art. A common approach is to use a technique called "background subtraction." Of course, other techniques can be used. The locations of the objects are typically recorded in a list that is associated with the video frame.

To track an object from frame to frame, a tracking method determines a correspondence between extracted objects in the current frame and extracted objects in the previous frame. This correspondence can be determined, for example, by using a predictive tracking method. The CAS system predicts the location of an object in the current frame based on the known locations of the object in previous frames. Subsequently, the predicted object location is compared to the actual object location to establish correspondence. Such a prediction is typically based on an algorithm that predicts likely object movement. For example, it can be assumed that objects move with constant velocity. More sophisticated techniques can, for example, verify that the colors of the objects match before determining a correspondence.

While conceptually simple, a robust tracking system faces many difficulties. Changes in scene lighting can affect the quality of object extraction, causing foreground elements to be misshapen or omitted completely. Object occlusions can cause objects to disappear or merge together, leading to difficulties in correspondence between frames. The tracked objects can change shape or color over time, preventing correspondence even though the objects were properly extracted.

In addition, even under ideal conditions, single-view tracking systems invariably lose track of monitored objects that leave the field-of-view of the camera. When multiple cameras are available, as in many close-captioned television systems, it is theoretically possible to reacquire the target when it appears in a different camera. This ability to perform automatic "sensor hand-off" is of significant practical interest. Current laboratory solutions require geometrically calibrated cameras with overlapping fields-of-view, conditions that are not readily achieved in typical CCTV installation.

SUMMARY OF THE INVENTION

It is an object of this invention to automate the correlation of image regions of video frames captured by a first camera with image regions of video frames captured by a second camera to aid CAS systems in identifying and tracking objects. A correlation between two image regions can help a CAS system correlate objects detected by different cameras, whether or not the cameras have overlapping fields-of-view.

Traditional methods of tracking an object between multiple camera fields-of-view attempt to correlate monitored objects with real-world physical locations. Such methods usually require detailed information about the scene being monitored, including camera placement and camera angle, which may change over time. In contrast, the methods and apparatus of the present invention need not be concerned with such physical real-world characteristics.

In one aspect, the invention relates to a method of image analysis that includes receiving image data representing two scenes. The first image data is for a plurality of first video frames that represent a first scene. Each of the first video frames includes a plurality of image regions. At least one of the image regions includes a first object. The second image data is for a plurality of second video frames that represent a second scene. Each of the second video frames includes a plurality of image regions. At least one of the image regions includes a second object.

The method of video analysis also includes the step of determining a relationship between first and second image regions of the plurality of image regions of the first and second video frames based on a probabilistic correlation between occurrences of the first object being present in the first image region and occurrences of the second object being present in the second image region. In one embodiment, the method includes determining a conditional probability that the first object is present in the first image region given that the second object is present in the second image region. In another embodiment, the method includes determining a joint probability that the first object is present in the first object region and that the second object is present in the second image region. In a further embodiment, the method includes determining a lift associated with the first object being present in the first image region and the second object being present in the second image region. In another embodiment, the method includes determining a correlation coefficient associated with the first object being present in the first image region and the second object being present in the second image region.

In one embodiment, the first image data originates from a first camera having a first field-of-view, and the second image data originates from a second camera having a second field-of-view. Features of the invention provide for the overlapping and non-overlapping first and second fields-of-view.

In one embodiment of the method, the number of occurrences of any object being present in the first and second image regions is counted. In another embodiment, the method includes counting the number of occurrences of any object being concurrently present in both the first and second image regions. In a further embodiment, the method includes counting, for each of a predetermined number of earlier time instants, the number of occurrences of both any object being currently present in the first image region and any object being present in the second image region at the earlier time instants. A time instant may be, for example, the instant that a camera generates a video frame. A time instant may also be a specified time interval, during which a camera may generate 0, 1, or more frames. In one embodiment, an object is considered to be present in an image region within a time interval if it has not disappeared before the time interval begins or if it appears before the time interval ends.

In another embodiment, a plurality of object attributes is provided. In one embodiment of the invention, the method includes counting the number of occurrences, for each of the attributes, of an object possessing that attribute being present in the first and second image regions. In another embodiment, the method includes counting the number of occurrences, for each attribute, of any object possessing such attribute being present in the first image region and an and second object possessing each attribute being present in a second image region. In a further embodiment, the method includes counting, for each attribute, and for each of a predetermined number of earlier time instants, the number of occurrences of an object possessing such attribute being present in the first image region and an object possessing each of the attribute being present in the second image region at the earlier time instants.

One feature of the invention includes determining a relationship between an image region from the first plurality of video frames and an image region from the second plurality of video frames, though the image regions may also both be from the same plurality of video frames. Additional features include determining either spatial or temporal relationships between the first and second image regions. Another feature of the invention includes correlating the first object in the first video frames with a second object present in the second video frames based on the determined relationship. Another feature includes determining that a first object present in one first video frame was not present in a preceding first video frame and correlating the first object with the second object present in the second video frames based on the relationship determined between image regions.

In another embodiment each image region has a location in one of the plurality of first and second video frames that is substantially the same across the plurality of first and second video frames. In another embodiment, the method includes maintaining an object list identifying at least the locations of the first object and the second object. Features of this embodiment include selecting an object present in one of the first and second video frames and determining whether the selected object is one of the first object, the second object, and a third object based at least in part on the object list and the determined relationship.

In another aspect, the invention relates to a video surveillance system. The video surveillance system includes a first memory module for receiving first image data representing a first scene and a second memory module for receiving second image data representing a second scene. The first image data is for a plurality of first video frames. Each of the first video frames includes a plurality of image regions. At least one of the image regions includes a first object. The second image data is for a plurality of second video frames. Each of the second video frames includes a plurality of image regions. At least one of the image regions includes a second object. The video surveillance system also includes a processing module for determining a relationship between first and second image regions of the plurality of image regions of the first and second video frames based on a probabilistic correlation between occurrences of the first object being present in the first image region and occurrences of the second object being present in the second image region.

In another aspect, the invention relates to a system of video surveillance that includes a means for receiving first and second image data for a plurality of first and second video frames representing first and second scenes. Each first and second video frame comprises a plurality of image regions. First and second objects are present in an image region of at least one first and second video frame, respectively. The system also includes a processing module for determining a relationship between first and second image regions of the plurality of image regions of the first and second video frames based on a probabilistic correlation between occurrences of the first object in the first image region and the second object in the second image region.

BRIEF DESCRIPTION OF THE DRAWINGS

The foregoing discussion will be understood more readily from the following detailed description of the invention, when taken in conjunction with the accompanying drawings.

DETAILED DESCRIPTION

In a surveillance system, cameras capture image data that depicts the interaction of people and things in a monitored environment. Types of cameras include analog video cameras, digital video cameras, or any device that can generate image data. The word "camera," is used as a generic term that encompasses any sensor that can output video data. In one embodiment, the CAS system observes a monitored environment through a number of input sensors although its primary sources of information are video cameras. The majority of CCTV installations use common visible-light video cameras. In such installations, the CAS system employs advanced video analysis algorithms for the extraction of information from analog NTSC or PAL video. These algorithms, however, are not limited to the visible light spectrum; they can also be applied to infrared video or even imagery from radar or sonar installations if available.

Figure 1:
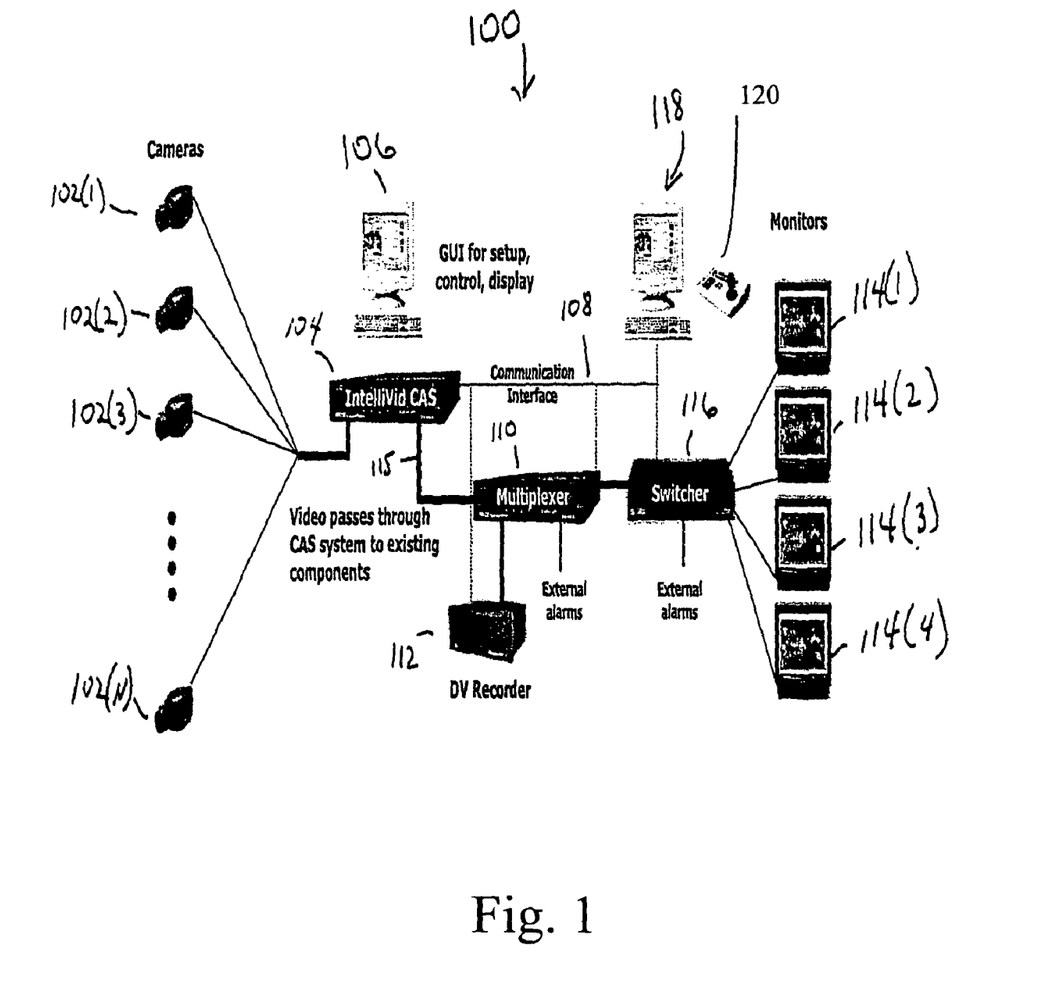
FIG. 1 is a block diagram of an illustrative overall computer-assisted surveillance ("CAS") system utilizing one aspect of the invention.

FIG. 1 shows an illustrative computer-assisted surveillance ("CAS") system 100. A plurality of cameras or other image input devices 102 provide image inputs to a computer 104 programmed to provide image analysis. CAS computer 104 can include a display 106 providing a graphical user interface for setup, control and display. CAS computer 104 can also include one or more user input devices (not shown) such as keyboards, mice, etc. to allow users to input control signals.

CAS computer 104 performs advanced image processing including image feature extraction and tracking. CAS computer 104 can automatically detect objects and activity and can generate warning and other information that can be transmitted over a digital communications network or other interface 108. CAS computer 104 also uses interface 108 to retrieve data, such as previously recorded video stored on recorder 112 or information stored on other computers. CAS computer 104 provides the outputs of the various cameras 102 to a multiplexer 110 for recording, typically continuous or stop-frame, by recorder 112 and for display on one or more displays 114 via a switcher 116. An additional user interface (e.g., provided by another computer 118 and user input including, for example, a joystick 120) can be used to allow an operator to control switcher 116 to select images to view and to control other parts of system 100 including CAS computer 104. Mutiplexer 110 and/or switcher 116 can respond to external alarms that occur when certain types of activity have been automatically detected (e.g., an alarm generated by a motion sensor) and record or display video appropriately. These alarms can also be generated by CAS computer 104 based on detected activities in the video streams.

The illustrative CAS Computer 104 system integrates seamlessly into any existing security infrastructure. The illustrative embodiment CAS system 100 is compatible with, for example, legacy analog video sources, in addition to newer digital video sources such as USB, FireWire, or IP cameras on wired or wireless networks. The CAS computer 104 acts as a passive repeater of its input signals, so that in the unlikely event of a CAS computer 104 failure, the remainder of the security infrastructure continues to function without the CAS computer 104.

While video cameras 102 are the typical primary sensors for the CAS system 100, the system can also accommodate other commonly-used sensors, such as motion detectors, smoke detectors, spill detectors, microphones, point-of-sale (POS) recordings, electronic article surveillance (EAS) systems, and access control systems. The illustrative CAS system 100 combines information from these sensors with the video analysis results to provide an even richer description of activities in the world. For example, POS information may be used with video images to verify that a customer purchased a particular product.

Figure 2:
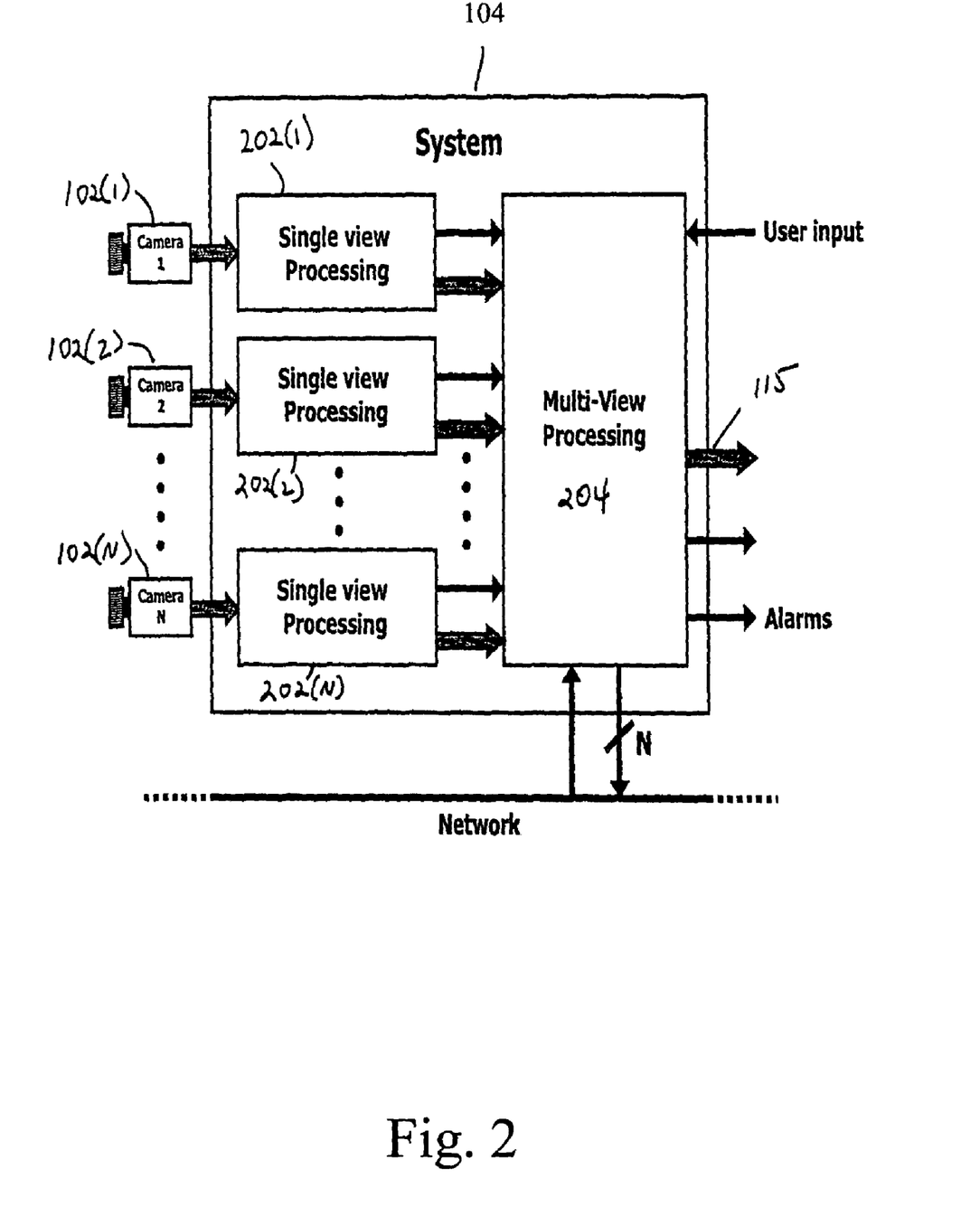
FIG. 2 is a high-level block diagram of an illustrative CAS computer according to one embodiment of the invention.

FIG. 2 shows a high-level block diagram of an illustrative CAS computer 104. For illustrative purposes, the computer components are grouped into two main classes: single-view processing blocks 202 (SVPs) and multi-view processing blocks 204 (MVPs). Each image input source is attached to a SVP 202. Image input sources include cameras 102 as well as a variety of storage devices including, for example, computer disks, VHS tapes, and digital videotapes. For purposes of data analysis, image data outputted by a video storage device is the equivalent of image data generated by a camera. Each SVP 202 typically performs video processing tasks that require only a single video stream. The outputs of the SVP 202 are connected to a MVP 204 that processes multiple video streams at once. Depending on the embodiment, a processing module includes a MVP 204, or a combination of one or more SVPs 202 and one or more MVPs 204. The CAS computer also includes memory modules (not shown) for receiving and storing incoming image data. The memory modules can be a part of the processing module, or they can be separate from the processing module.

The single-view processing components 202 and the multi-view processing components 204 typically analyze data as a series of video frames depicting a scene. In one embodiment, image data is analyzed directly from a camera.

In another embodiment, the analyzed image data can originate from a storage device. Some cameras and video storage devices create and store image data on a frame-by-frame basis. Other storage systems may only store video frame updates, i.e. detected changes to the scene. To carry out analysis of image data, the CAS computer 104 constructs a video frame from stored image data that may be stored in a variety of devices and formats.

A video frame is composed of a plurality of pixels. The number of pixels in a video frame typically depends on, among other factors, the resolution of the camera generating the video frame, the display on which the video frame is presented, and the capacity of the storage device on which the video frames are stored. Analysis of a video frame can be conducted either at the pixel level or by analyzing groups of pixels depending on the processing power available and the level of precision desired. A pixel or group of pixels to be analyzed is referred to herein as an "image region."

In one illustrative embodiment, the multi-view processing components 204 of the CAS computer 104 correlates image regions of a first plurality of video frames generated by a first camera with image regions of a second plurality of video frames generated by a second camera. Correlation of image regions of video frames generated by different sources can help a CAS computer 104 track an object moving through and between different scenes.

Figure 3:
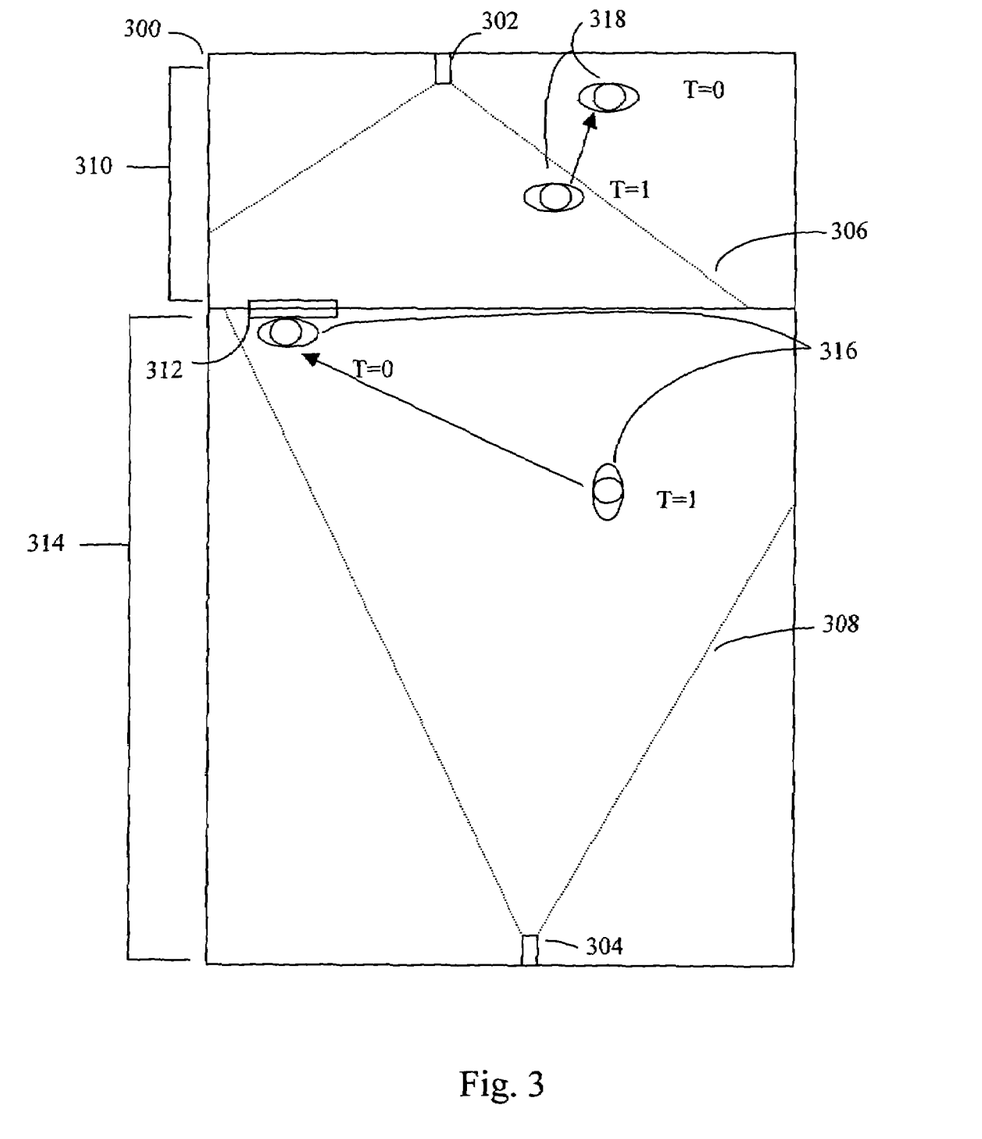
FIG. 3 is an overhead illustration of one environment being monitored according to an illustrative embodiment of the invention.

FIG. 3 is an illustration of a one environment (e.g., a retail store 300) being monitored by a CAS system 100 according to an illustrative embodiment of the invention. The retail store utilizes first and second cameras 302, 304, each having their own fields-of-view 306 and 308. The first camera is monitoring a first room 310 that includes a doorway 312. The second camera 304 is monitoring a second room 314. The field-of-view 308 of the second camera 304 includes the opposing side of the doorway 312.

The environment 300 includes first and second objects 316 and 318 at two time instants, T=0 and T=1, i.e. the time that a most recent set of video frames is generated by the first and second cameras 302 and 304, and the instant in time one frame earlier, respectively. In the time period between T=1 and T=0, the first object 316 moved from a location only in the field-of-view 308 of the second camera 304 to a location that is inside the fields-of-view 306 and 308 of both cameras 302 and 304. During that same time period, the second object 318 moved from a location in the field-of-view 306 of the first camera to a location outside of the fields-of-view 306 and 308 of either camera 302 or 304.

Figures 4A, 4B:
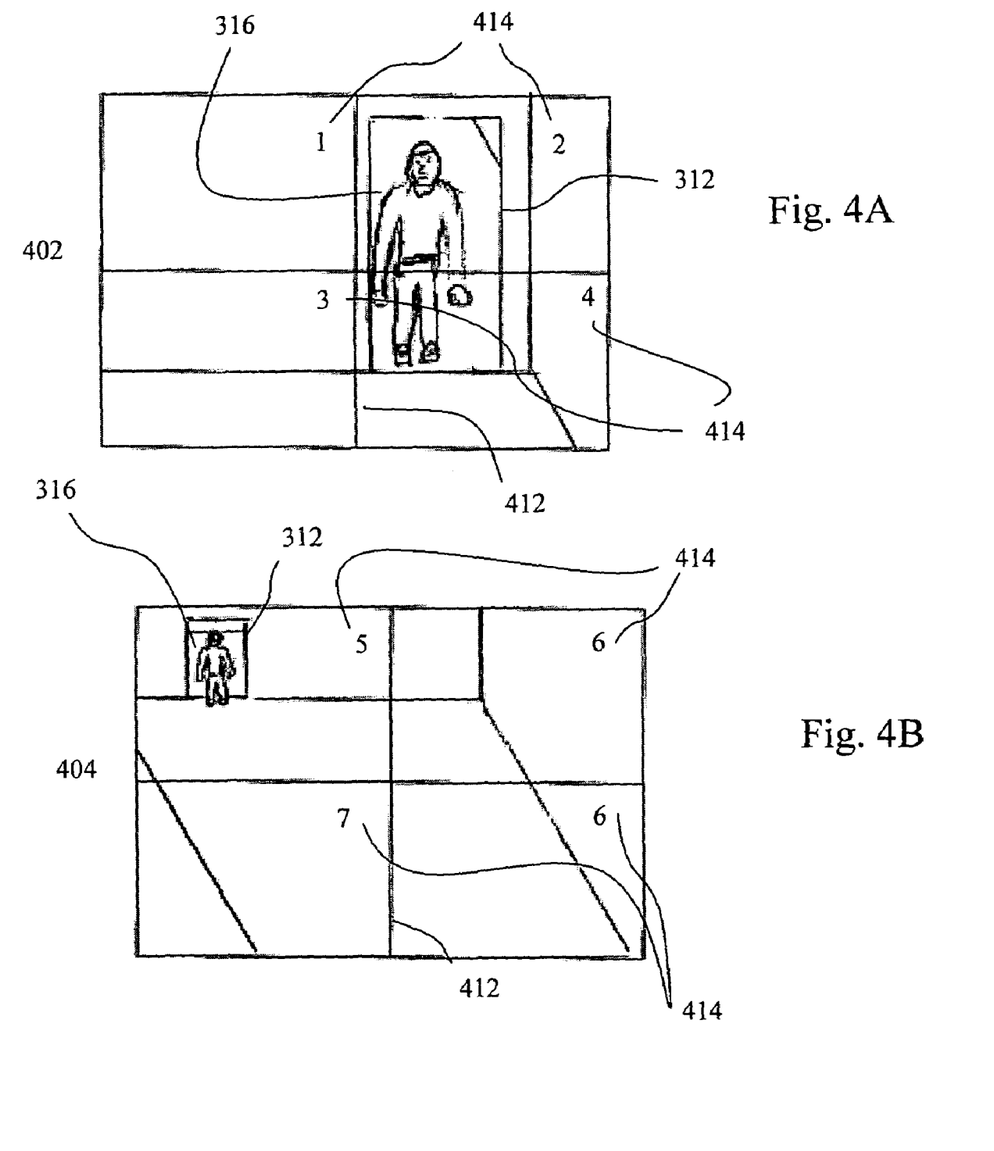
FIG. 4A is a schematic illustration of a video frame generated by a first camera located in the environment illustrated in FIG. 3.
FIG. 4B is a schematic illustration of a video frame generated by a second camera located in the environment illustrated in FIG. 3.
Figure 4C:
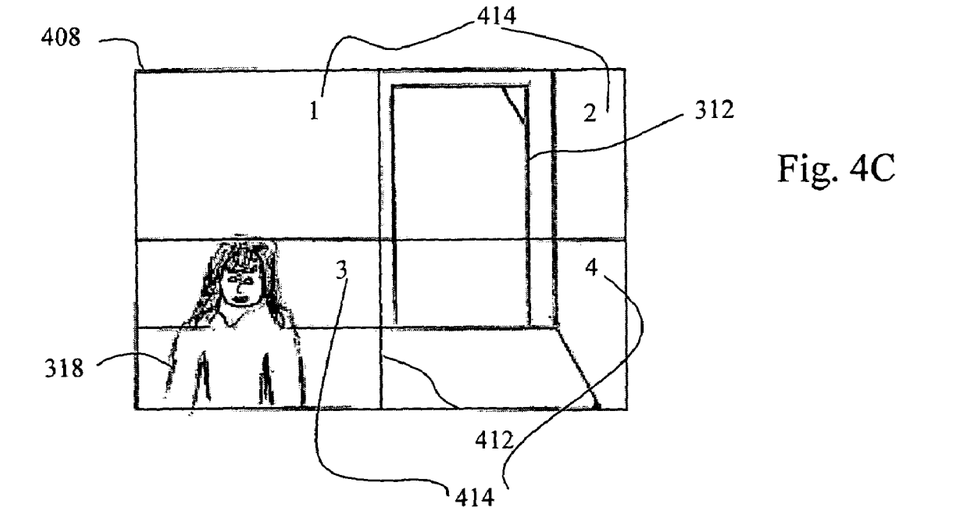
FIG. 4C is a schematic illustration of a previously generated video frame generated by the first camera.
Figure 4D:
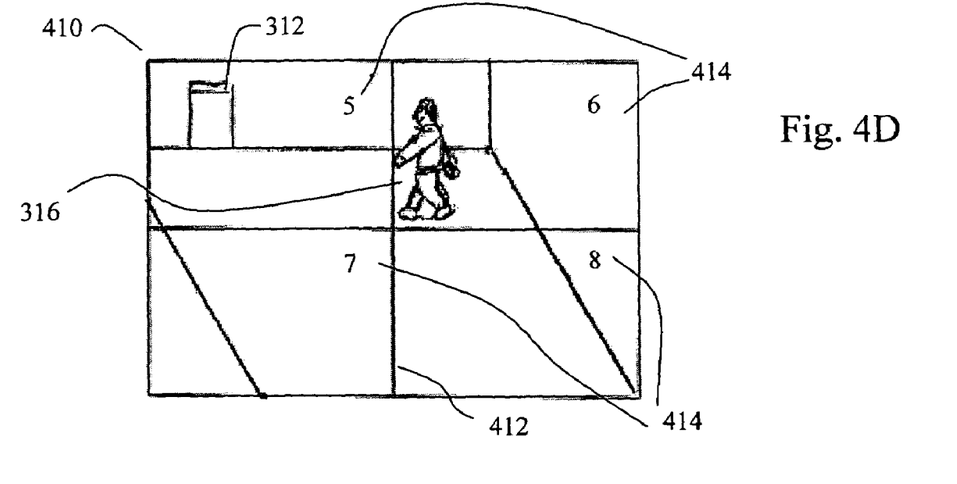
FIG. 4D is a schematic illustration of a previously generated video frame generated by the second camera.

FIGS. 4A and 4B are schematic illustrations of the most recent set of video frames 402 and 404 generated by the first and second cameras 302 and 304, respectively, at time instant T=0. Similarly, FIGS. 4C and 4D are illustrations of the earlier set of video frames 408 and 410 generated by the first and second cameras 302 and 304, respectively, at time instant T=1. Illustrative gridlines 412 defining the boundaries of image regions and number designations 414 assigned to each image region in video frames 402, 404, 408, 410 are overlaid on the figures for illustrative purposes.

Figure 5:
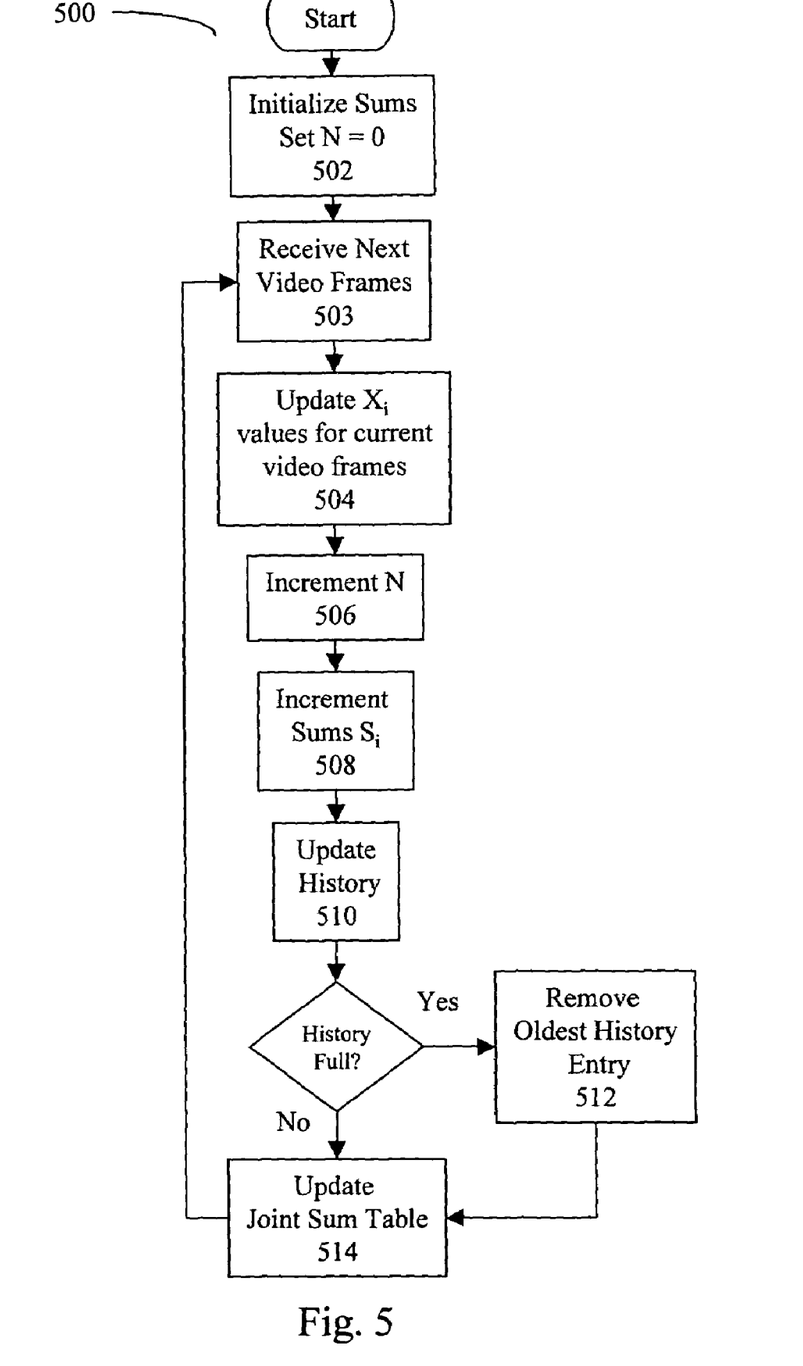
FIG. 5 is a flow chart of a method for gathering correlation data according to an illustrative embodiment of the invention.

FIG. 5 is a flow chart depicting one illustrative method 500 of gathering information from video frames that is useful for determining object correlations according to an illustrative embodiment of the invention. The method 500 steps can be broken down into those carried out by the SVPs 202 of the CAS computer 104 and the MVPs 204. However, the steps do not need to be divided among a plurality of processing blocks; and in other embodiments, the MVP 204 or some other processing element carries out all of the steps.

A SVP analyzes a single series of video frames generated by a single camera. Each SVP 202 maintains a count, N, of frames that the SVP 202 has analyzed.

Figure 6A:
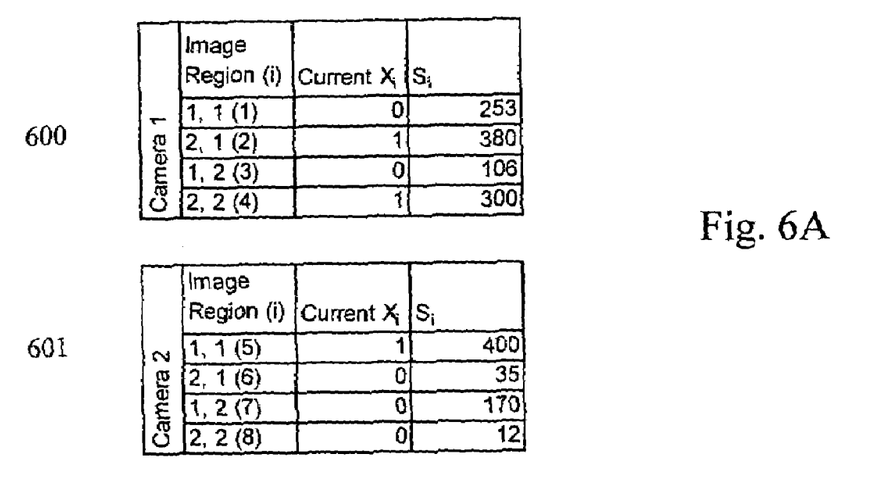
FIG. 6A depicts two illustrative data tables used for monitoring the environment of FIG. 3 according to an illustrative embodiment of the invention.

FIG. 6A depicts two illustrative data tables 600 and 601 used by the SVPs 202 responsible for monitoring different portions of the monitored environment 300, according to an illustrative embodiment of the invention. The $S_i$ columns of the data tables 601 and 602 include purely illustrative data that are not intended to represent any true sample data. In the illustrative embodiment, for each image region, i, in a series of video frames, the data tables 600 and 601 store a single bit, $X_i$, indicating whether an object is present in the instant video frame being analyzed and a sum, $S_i$, equal to the number of frames in which any object has been present in image region i. In the two-camera monitored environment 300 depicted in FIG. 3, and as depicted in the overlays on FIGS. 4A-4D, a first SVP 202 maintains a first data table 600 to monitor image regions i=1-4, and a second SVP 202 maintains a second data table 601 to monitor image regions i=5-8. If a user adds a third camera to the system, the CAS system 100 maintains a third data table to monitor image regions i=9-12, etc.

Referring to FIGS. 5 and 6, on start up, each SVP 202 initializes its data table 600 and 601, and N is set to zero (step 502). Each SVP 202 receives a first video frame and begins its analysis (Step 503). The SVPs 202 update the $X_i$ values (step 504) in their respective data tables 600 and 601 by i) detecting objects within the first video frame using a technique known in the art for object extraction, ii) determining the image regions in which those objects are present, and iii) setting $X_i$ accordingly. For each region, $X_i$ is set to 1 if an object is present within the image region or 0 if an object not present in the image region. For example, with reference to video frames 402 and 404 at time instant T=0, objects are present in image regions 2, 4, and 5. Note that the values for $X_i$ in data tables 600 and 601 are set accordingly. In another embodiment, the SVPs only attribute an object's presence to the image region in which the largest number of that object's pixels is located. In an alternative embodiment, instead of conducting one object extraction step for an entire video frame and then determining the image regions in which the objects are present, each SVP 202 carries out an object extraction step for each image region individually, and updates the data tables 600 and 601, one image region at a time.

In an alternative embodiment, $X_i$ is used to represent a more general binary variable as opposed to specifically referring to a single image region. For example, in one embodiment, $X_1$, $X_2$, and $X_3$ stores a bit indicating whether a small, medium, or large object, respectively, is present in image region 1. In such a system, for a video frame having four image regions, the data table 600 stores data for $X_1$-$X_{12}$ and $S_1$-$S_{12}$. In another embodiment, $X_1$ represents the presence of a moving object and $X_2$ represents a stationary object. In this embodiment, the CAS computer 104 would track eight variables, $X_1$-$X_8$, and eight sums, $S_1$-$S_8$, for a video frame having four image regions.

After updating the $X_i$ values of data tables 600 and 601 (step 504), the single view-processing blocks increment N (step 506) and update the sums, $S_i$, in the data table 600 and 601 (step 508) by incrementing the previously stored sum of each image region where $X_i$=1. Referring back to FIGS. 4A-4B. As a result of analyzing video frames 402 and 404, the sums for S2, 24, and S5 are each incremented by one.

Figure 6B:
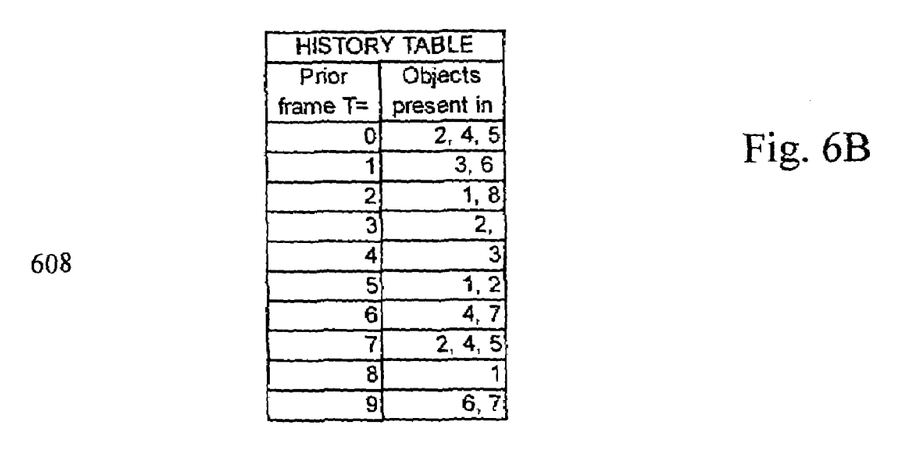
FIG. 6B is an illustrative history table used by an illustrative embodiment of the invention.

FIG. 6B is an illustrative central history table 608 maintained by the SVPs 202. The central history table 608 includes a list of image regions in which objects have been present in a predetermined number of earlier video frames, for example, the last 10 frames. History tables 608 can stores as many frames as the resources of the CAS computer 104 allow for. The single view processing blocks 202 update the history table 608 (step 510) by filling a new entry listing the image regions in which objects were present in the current video frame. If the number of entries in the history table 608 exceeds the capacity of the history table 608, the oldest entry is deleted (step 512).

The first two entries of the illustrative history table 608 demonstrate the data that is stored in response to SVPs analyzing video frames 402, 404, 408, and 410. In the most recent entry, at time instant T=0, the history table 608 lists image regions 2, 4, and 5, i.e., the image regions for which $X_i$ had been set to 1. Referring to the immediately preceding entry, at time instant T=1, as depicted in video frames 408 and 410, objects were present in image regions 3 and 6. In the illustrative embodiment the entry for T=9 stores a list of the image regions in which objects were present in the video frames analyzed 9 frames earlier. In an alternative embodiment, each SVP maintains its own history table 608.

Cameras 302 and 304 do not need to have the same frame rate. In one embodiment, if the camera 302 and 304 frame rates are different, the SVPs' 202 updating of the history table 608 is regulated by the MVP 204. For example, the MPV 204 directs both SVPs 202 to update the history table every time a selected camera 302 or 304 generates a new video frame. If the selected camera is the camera with the higher frame rate, the SVP 202 monitoring the camera with the slower frame rate adds the same list of image regions to each new entry of the history table 608 until a new video frame is generated. If the selected camera is the camera with the slower frame rate, the SVP 202 monitoring the camera with the higher frame rate continues updating its data table 600 or 601 without sending information to the history table 608. In that case, each SVP 202 and the MVP 204 maintain their own value of N. Alternatively, the SVP 202 monitoring the faster camera can totally disregard video frames that are not used to update the history table 608 and N is equal to the number of frames analyzed by the camera with the slower frame rate.

In an alternative embodiment, the MVP 204 maintains one definitive history table 608 for all image regions. The MVP 204 defines a time instant (i.e., period) during which either camera may generate zero, one, or more video frame(s). If an object is an image region of a video frame at the beginning of the time period or in an image region in any video frame generated during that time instant, the MVP 204 considers the object present in that image region at that time instant.

Figure 6C:
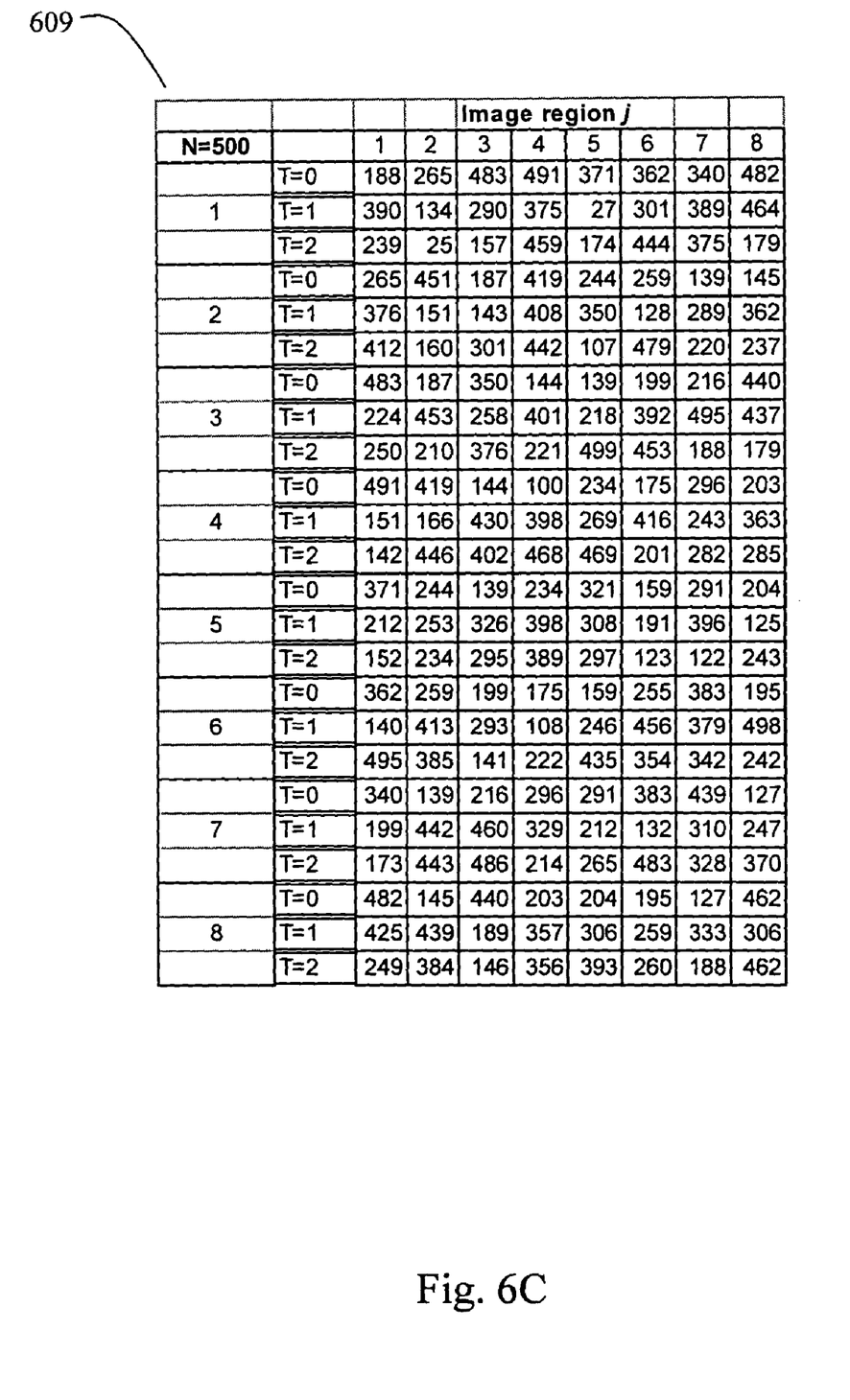
FIG. 6C is an illustrative joint-sum table used by an illustrative embodiment of the invention

FIG. 6C is an illustrative joint-sum table 609 maintained by the MVP 204. The illustrative joint sum table 609 includes purely illustrative data that are not intended to represent any true sample data. The MVP populates the joint-sum table from data tables 600 and 601 of the SVPs 202 and the central history table 608. For illustrative purposes, the illustrative joint-sum table 609 is abbreviated in that it only maintains data for T=0-T=2. Preferably, the joint-sum table 609 stores data that takes into account a number of time instances equal to the number of entries stored in the history table 608. The joint-sum table 609 stores a count of the number of times that any object is present in a first image region i at a time instance T, and any object (not necessarily the same object) is also present in an image region j at time instant $T_0$. The joint-sum is equivalent to the following equation:

$$\mathrm{Sum}_{i,j,T} = \mathrm{Sum}_{i,j,T} + X_i[0] * X_j[-T] \quad (1)$$

The number within the brackets represents time separation in terms of video frames. That is, $X_i[0]$ is equal to the value of $X_i$ at the present. $X_j[-T]$ is equal to the value of $X_j$ for the video frame captured T video frames prior to the current video frame. For example, with reference to the joint-sum table 609, objects were simultaneously present in image regions i=2 and j=1 265 times. Similarly, in only twenty-five instances was an object present in image i=2 two frames after an object was present in image region j=1.

After the video frames for each camera are analyzed by the SVPs 202 (steps 504-512), the MVP 204 updates the joint-sum table 609 (step 514). The CAS computer 104 steps through the history table 608 incrementing appropriate entries in the joint-sum table 609. Since an entry in the joint-sum table 609 only is incremented when an object is present in both image regions being considered, the MVP 204 does not have to consider each and every entry in the joint-sum table. The number of updates (NumUpdates) is a function of the number of entries in the history table (HistorySize) and the number of image regions listed in each history table time instant entry (H[T]) and is equal to the following:

$$NumUpdates = \sum_{T=0}^{HistorySize} H[0] * H[T] \quad (2)$$

For example, in analyzing the illustrative history table 608, the CAS computer 104 first analyzes the entry for time instant T=0. The entry lists image regions 2, 4, and 5. That is, objects were jointly present in image region combinations i,j: [2, 2], [2, 4], [2, 5], [4, 2], [4, 4], [4, 5], [5, 2], [5, 4], and [5, 5]. As a result the MVP 204 increments the sums for the joint-sum table 609 entries: $\mathrm{Sum}_{220}$, $\mathrm{Sum}_{240}$, $\mathrm{Sum}_{250}$, $\mathrm{Sum}_{420}$, $\mathrm{Sum}_{440}$, $\mathrm{Sum}_{450}$, $\mathrm{Sum}_{520}$, $\mathrm{Sum}_{540}$, and $\mathrm{Sum}_{550}$. Next, the MVP 204 analyzes the history table 608 entry for time instant T=0 with respect to the history table 608 entry for time instant T=1. The history table 608 entry for time instant T=1 lists image regions 3 and 6. That is, objects were present in image regions 3 and 6 one time instant before objects were present in image regions 2, 4 and 5. Therefore the MVP 204 increments the joint-sum table 609 entries: $\mathrm{Sum}_{231}$, $\mathrm{Sum}_{261}$, $\mathrm{Sum}_{431}$, $\mathrm{Sum}_{461}$, $\mathrm{Sum}_{531}$, and $\mathrm{Sum}_{561}$. The process continues until the MVP 204 compares the most recent entry in the history table 608 with the least recent entry in the history table 608. After the joint-sum table 609 has been updated (step 514), the CAS computer 104 begins analyzing the next set of video frames (step 503).

The CAS computer 104 utilizes the data stored in the data tables 600 and 601 and the joint-sum table 609 to calculate a variety of useful statistics. For illustrative purposes, each table 601, 602, and 609 is assumed to have the same value N. The most basic information that can be measured from the data is the probability that an object is present in a given image region i, or mathematically, $p(X_i=1)$. This probability is estimated with the following equation:

$$p(X_i = 1) = \frac{S_i + 1}{N + 2} \quad (3)$$

This formula is just one of many ways to estimate this probability, and the operation of the invention is not sensitive to the specific probability estimation technique used.

Similarly, the CAS computer 104 can use the stored data to calculate a joint probability. For example the probability that $X_i=1$ and $X_j=1$, i.e. the probability that an object is present in both image regions i and j, can be estimated using data from the joint-sum table:

$$p(X_i = 1, X_j = 1) = \frac{Sum_{ij0} + 1}{N + 2} \quad (4)$$

A conditional probability, such as the probability that an object is present in image region i given that an object is present in image j can be calculated as follows:

$$p(X_i = 1 \mid X_j = 1) = \frac{p(X_i = 1, X_j = 1)}{p(X_j = 1)} = \frac{Sum_{ij0} + 1}{S_j + 1} \quad (5)$$

To calculate the probability that $X_i$ equals 1, given that $X_j=1$ T frames prior, the CAS can alter equation (5) as follows:

$$p(X_i = 1 \mid X_j[-T] = 1) = \frac{(Sum_{ijT} + 1)(N + 2)}{(N - T + 2)(S_j + 1)} \quad (6)$$

More interestingly, the CAS computer 104 can use the stored data to calculate the "lift" between two image regions. Lift provides a measure of dependence between two variables and can be used to determine if two variables are related or not. In the context of multi-camera object monitoring, lift can be used to determine if the presence of an object in one image region is statistically related to the presence of an object in another image region. A high lift between two image regions indicates that the object in the first image region is likely the same physical object as the object in the second image region. The lift associated with the concurrent appearance of two objects in different image regions is computed with the following equation:

$$lift(X_i, X_j) = \frac{p(X_i = 1, X_j = 1)}{p(X_i = 1)p(X_j = 1)} = \frac{(Sum_{ij0} + 1)(N + 2)}{(S_i + 1)(S_j + 1)} \quad (7)$$

Similarly, the lift associated with the presence of two objects in two image regions separated by T frames in time is computed with following equation:

$$lift(X_i, X_j[T]) = \frac{(Sum_{ijT} + 1)(N + 2)^2}{(S_i + 1)(S_j + 1)(N - T + 2)} \quad (8)$$

A lift value of 1 indicates that the two variables are independent (unrelated), while any other value indicates otherwise. For example, a lift value much greater than 1 indicates that it is much more likely for two objects to appear at the same time instant rather than in isolation. For example the lift between image regions 2 and 5 at T=0 is likely much greater than 1. This finding indicates that those two cameras might overlap in the region represented by the two variables. Similarly, in a case where two camera fields-of-view do not overlap, a high lift value is expected between, for example, an image region in a first field-of-view that included the top of an escalator and a time-separated image region from a second field-of-view that included the bottom of the escalator.

The CAS computer can also calculate a correlation coefficient between two image regions. Similar to lift, a correlation coefficient is a measure of the degree of correlation between the two variables. Its value ranges from −1 to 1, where a value of 0 indicates no correlation, positive values indicate stronger positive correlation, and negative values indicate stronger negative correlation. A positive correlation means that the presence of an object in one image region indicates an object is likely present in the other. Likewise, a negative correlation means that the presence of an object in one image region indicates an objects is likely absent in the other image region. The correlation coefficient between a first image region $X_i$ and a second image region $X_j$ is computed according to the following equation:

$$corrcoef(X_i, X_j) = \qquad (9)$$

$$\frac{p(X_i = 1, X_j = 1) - p(X_i = 1)p(X_j = 1)}{\sqrt{p(X_i = 1)(1 - p(X_i = 1))p(X_j = 1)(1 - p(X_j = 1))}}$$

In terms of the data stored in the data tables 600 and 601 and the joint-sum table 609, the correlation coefficient between two image regions at the same time instant is computed according to the following equation:

$$corrcoef(X_i, X_j) = \frac{(Sum_{ij0} + 1)(N + 2) - (S_i + 1)(S_j + 1)}{\sqrt{(S_i + 1)(N + 1 - S_i)(S_i + 1)(N + 1 - S_i)}} \quad (10)$$

The correlation coefficient between a first image region at one time instant and a second image region at another time instant is computed according to the following equation:

$$corrcoef(X_i, X_j[-T]) = \frac{\frac{(Sum_{ijT} + 1)(N + 2)^2}{(N - T + 2)} - (S_i + 1)(S_j + 1)}{\sqrt{(S_i + 1)(N + 1 - S_i)(S_j + 1)(N + 1 - S_j)}} \quad (11)$$

Figure 7:
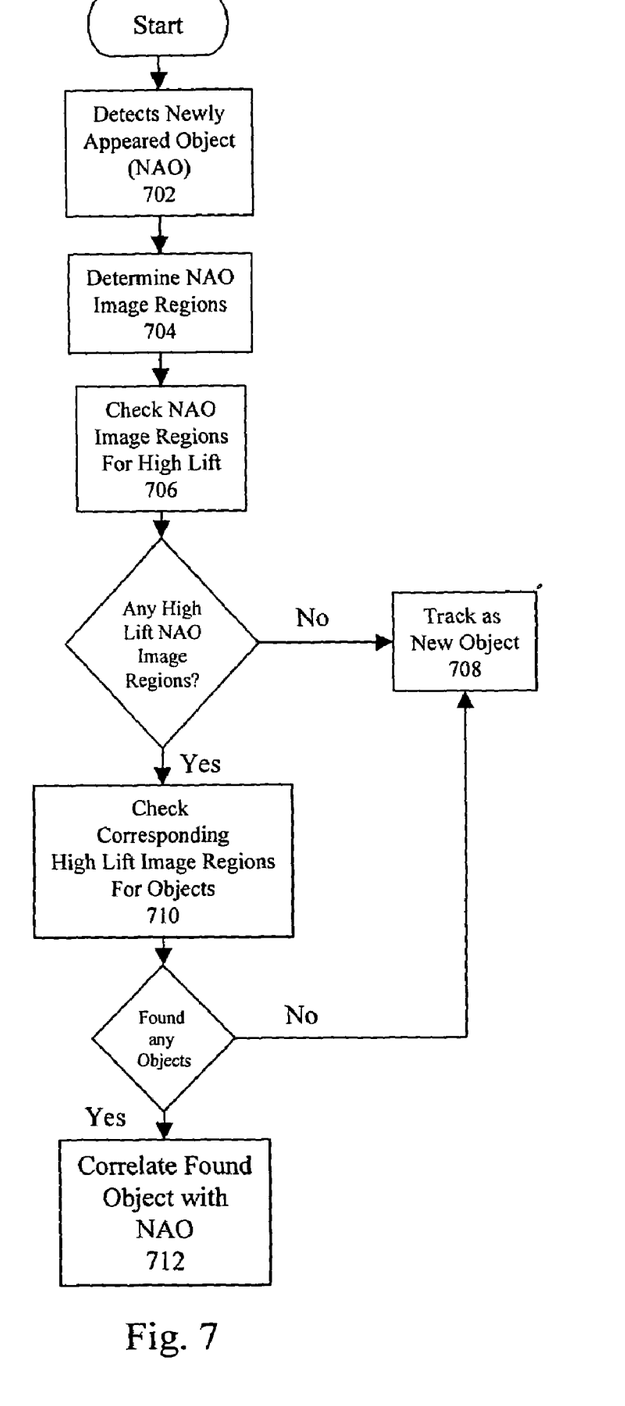
FIG. 7 is a flow chart of a method for correlating newly appeared objects in a first camera field-of-view with objects that previously appeared in a second camera field-of-view.

The benefits of being able to calculate the lift, correlation coefficient and other statistical values can be more clearly understood with reference to FIG. 7. In a multi-camera CAS system, objects can move between camera fields-of-view. Typically, a CAS system attempts to track an object by correlating an object's presence in one video frame with a object that had been present in the previous video frame. Such a methodology typically includes maintaining an object list that includes the location of previously detected objects. In some cases, object lists store additional information about previously detected objects, such as color, velocity, and size. When attempting to correlate objects in a current video frame with objects in a previous video frame, a traditional CAS system 100 refers to the object list for helpful information. Such a tracking methodology is incapable of correctly correlating a newly present object in a video frame generated by a first camera's field-of-view with an earlier detected object from a different camera's field-of-view unless a relationship is known between camera fields-of-view. The statistical calculations described above that are derived from the data tables 600 and 601 and the joint-sum table 609 provide such a relationship.

FIG. 7 is a flow chart depicting a method 700 of correlating a newly appeared object in a field-of-view with a previously detected object from a second field-of-view according to one illustrative embodiment of the invention. If the CAS computer 104 determines that an object is newly present in a video frame (step 702), the CAS computer 104 attempts to determine whether the object has previously been detected in other camera fields-of-view. The CAS computer 104 determines the image regions of the video frame in which the object is present (step 704). For each region in which the newly present object is present, the CAS computer 104 then determines whether there is a high lift value between that region and any other region (step 706). If none of the image regions in which the newly appeared object is present have high lift values associated with them, the CAS computer 104 begins tracking the newly appeared object as a new object (step 708). If an image region has a high lift value between it and a second image region, the CAS computer 104 consults the history table 608 to determine whether a previously detected object is or was present in that second region (step 710). The high lift image regions may be time separated from the present video frame, particularly if the camera fields-of-view of the two cameras generating the video frames do not overlap. If a previously detected object is or was present in the second region the CAS computer 104 correlates the newly appeared object with the previously detected object (step 712). Otherwise, the CAS computer 104 begins tracking the object as a new object (step 708). In another embodiment, instead of considering high lift values, the method 700 considers strongly positive correlation coefficients.

To carry out the method 700, the CAS computer 104 need not have any knowledge about the physical spatial relationship between the fields-of-view that it is monitoring. The correlations are based on statistical relationships between data that is generated independently for each camera field-of-view.

One skilled in the art will realize the invention may be embodied in other specific forms without departing from the spirit or essential characteristics thereof. The foregoing embodiments are therefore to be considered in all respects illustrative rather than limiting of the invention. The scope of the invention is not limited to just the foregoing description.

The invention claimed is:

1. A computerized method of image analysis comprising:
   a) receiving first image data for a plurality of first video frames representing a first scene, wherein (i) each first video frame comprises a plurality of image regions and (ii) a first object is present in an image region of at least one first video frame;
   b) receiving second image data for a plurality of second video frames representing a second scene, wherein (i) each second video frame comprises a plurality of image regions and (ii) a second object is present in an image region of at least one second video frame; and
   c) determining (i) a relationship between first and second image regions of the plurality of image regions of the first and second video frames based on a probabilistic correlation between occurrences of the first object being present in the first image region and occurrences of the second object being present in the second image region and (ii) a lift associated with the first object being present in the first image region and the second object being present in the second image region.

2. The method of claim 1 wherein step c) further comprises c-1) determining a conditional probability that the first object is present in the first image region given that the second object is present in the second image region.

3. The method of claim 1 wherein step c) further comprises c-1) determining a joint probability that the first object is present in the first object region and that the second object is present in the second image region.

4. The method of claim 1 wherein step c) further comprises c-1) determining a correlation coefficient associated with the first object being present in the first image region and the second object being present in the second image region.

5. The method of claim 1 wherein the first image data originates from a first camera having a first field-of-view, and the second image data originates from a second camera having a second field-of-view.

6. The method of claim 5 wherein the first field-of-view and the second field-of-view at least in part overlap.

7. The method of claim 5 wherein the first field-of-view and the second field-of-view do not overlap.

8. The method of claim 1 wherein the first image region is one of the image regions that comprises the first video frames and the second image region is one of the image regions that comprises the second video frames.

9. The method of claim 1 wherein the first image region and the second image region are both image regions that comprise one of the first video frames and the second video frames.

10. The method of claim 1 wherein the first object and the second object are the same object.

11. The method of claim 1 wherein the first object and the second object are different objects.

12. The method of claim 1 wherein step c) comprises determining a temporal relationship between occurrences of the presence of the first object in the first image region and occurrences of the presence of the second object in the second image region.

13. The method of claim 1 wherein step c) comprises determining a spatial relationship between the first image region and the second image region.

14. The method of claim 1 further comprising d) counting the number of occurrences of any object being present in the first and second image regions.

15. The method of claim 1 further comprising d) counting the number of occurrences of any object being concurrently present in both the first and second image regions.

16. The method of claim 1 further comprising d) counting, for each of a predetermined number of earlier time instants, the number of occurrences of both any object being currently present in the first image region and any object being present in the second image region at the earlier time instants.

17. The method of claim 1 further comprising d) correlating the first object in the first video frames with a second object present in the second video frames based on the determined relationship.

18. A surveillance system comprising:
   a) a first memory module for receiving first image data for a plurality of first video frames representing a first scene, wherein (i) each first video frame comprises a plurality of image regions and (ii) a first object is present in an image region of at least one first video frame;
   b) a second memory module for receiving second image data for a plurality of second video frames representing a second scene, wherein (i) each second video frame comprises a plurality of image regions and (ii) a second object is present in an image region of at least one second video frame; and c) a processing module for determining (i) a relationship between first and second image regions of the plurality of image regions of the first and second video frames based on a probabilistic correlation between occurrences of the first object being present in the first image region and occurrences of the second object being present in the second image region and (ii) a lift associated with the first object being present in the first image region and the second object being present in the second image region.

19. The surveillance system of claim 18 wherein the processing module further determines a conditional probability that the first object is present in the first image region given that the second object is present in the second image region.

20. The surveillance system of claim 18 wherein the processing module further determines a joint probability that the first object is present in the first object region and that the second object is present in the second image region.

21. The surveillance system of claim 18 wherein the processing module further determines a correlation coefficient associated with the first object being present in the first image region and the second object being present in the second image region.

22. The surveillance system of claim 18 wherein the first image data originates from a first camera having a first field-of-view, and the second image data originates from a second camera having a second field-of-view.

23. The surveillance system of claim 22 wherein the first field-of-view and the second field-of-view at least in part overlap.

24. The surveillance system of claim 22 wherein the first field-of-view and the second field-of-view do not overlap.

25. The surveillance system of claim 18 wherein the first image region is one of the image regions that comprises the first video frames and the second image region is one of the image regions that comprises the second video frames.

26. The surveillance system of claim 18 wherein the first image region and the second image region are both image regions that comprise one of the first video frames and the second video frames.

27. The surveillance system of claim 18 wherein the first object and the second object are the same object.

28. The surveillance system of claim 18 wherein the first object and the second object are different objects.

29. The surveillance system of claim 18 wherein the processing module determines a temporal relationship between occurrences of the presence of the first object in the first image region and occurrences of the presence of the second object in the second image region.

30. The surveillance system of claim 18 wherein the processing module determines a spatial relationship between the first image region and the second image region.

31. The surveillance system of claim 18 wherein the processing module further counts the number of occurrences of any object being present in the first and second image regions.

32. The surveillance system of claim 18 wherein the processing module further counts the number of occurrences of any object being concurrently present in both the first and second image regions.

33. The surveillance system of claim 18 wherein the processing module further counts, for each of a predetermined number of earlier time instants, the number of occurrences of both any object being currently present in the first image region and any object being present in the second image region at the earlier time instants.

34. The surveillance system of claim 18 wherein the processing module further correlates the first object in the first video frames with a second object present in the second video frames based on the determined relationship.

35. A computerized method of image analysis comprising:
a) receiving first image data for a plurality of first video frames representing a first scene, wherein (i) each first video frame comprises a plurality of image regions and (ii) a first object is present in an image region of at least one first video frame;
b) receiving second image data for a plurality of second video frames representing a second scene, wherein (i) each second video frame comprises a plurality of image regions and (ii) a second object is present in an image region of at least one second video frame;
c) providing a plurality of attributes for the first and second objects;
d) counting for each of the plurality of attributes, the number of occurrences of at least one of the first and second objects having such attribute being present in the first and second image regions; and
e) determining a relationship between first and second image regions of the plurality of image regions of the first and second video frames based on a probabilistic correlation between occurrences of the first object being present in the first image region and occurrences of the second object being present in the second image region.

36. The method of claim 35 wherein step d) further comprises counting, for each of the plurality of attributes, the number of occurrences of one of the first and second objects with each attribute being present in the first image region concurrently with one of the first and second objects having each attribute being present in second image regions.

37. The method of claim 35 wherein step d) further comprises counting, for each of a predetermined number of earlier time instants, and for each of the plurality of attributes, the number of occurrences of both any one of the first and second objects having such attribute being currently present in the first image region and any one of the first and second objects having each attribute being present in the second image region at the earlier time instants.

38. A computerized method of image analysis comprising:
a) receiving first image data for a plurality of first video frames representing a first scene, wherein (i) each first video frame comprises a plurality of image regions and (ii) a first object is present in an image region of at least one first video frame;
b) receiving second image data for a plurality of second video frames representing a second scene, wherein (i) each second video frame comprises a plurality of image regions and (ii) a second object is present in an image region of at least one second video frame;
c) determining a relationship between first and second image regions of the plurality of image regions of the first and second video frames based on a probabilistic correlation between occurrences of the first object being present in the first image region and occurrences of the second object being present in the second image region.
d) determining that the first object present in one first video frame was not present in a preceding first video frame; and e) correlating the first object with the second object present in the second video frames based on the determined relationship.

39. A computerized method of image analysis comprising:
a) receiving first image data for a plurality of first video frames representing a first scene, wherein (i) each first video frame comprises a plurality of image regions and (ii) a first object is present in an image region of at least one first video frame;
b) receiving second image data for a plurality of second video frames representing a second scene, wherein (i) each second video frame comprises a plurality of image regions wherein each image region has a location in one of the plurality of first and second video frames that is substantially the same across the plurality of first and second video frames and (ii) a second object is present in an image region of at least one second video frame; and
c) determining a relationship between first and second image regions of the plurality of image regions of the first and second video frames based on a probabilistic correlation between occurrences of the first object being present in the first image region and occurrences of the second object being present in the second image region.

40. The method of claim 39 further comprising d) maintaining an object list identifying at least the locations of the first object and the second object.

41. The method of claim 40 further comprising:
e) selecting an object present in one of the first and second video frames;
f) determining whether the selected object is one of the first object, the second object, and a third object based at least in part on the object list and the determined relationship.

42. A surveillance system comprising:
a) a first memory module for receiving first image data for a plurality of first video frames representing a first scene, wherein (i) each first video frame comprises a plurality of image regions and (ii) a first object is present in an image region of at least one first video frame;
b) a second memory module for receiving second image data for a plurality of second video frames representing a second scene, wherein (i) each second video frame comprises a plurality of image regions and (ii) a second object is present in an image region of at least one second video frame; and
c) a processing module for (i) providing a plurality of attributes for objects, (ii) counting for each of the plurality of attributes, the number of occurrences of an object having such attribute being present in the first and second image regions, and (iii) determining a relationship between first and second image regions of the plurality of image regions of the first and second video frames based on a probabilistic correlation between occurrences of the first object being present in the first image region and occurrences of the second object being present in the second image region.

43. The surveillance system of claim 42 wherein the processing module further counts, for each of the plurality of attributes, the number of occurrences of one of the first and second objects with each attribute being present in the first image region concurrently with one of the first and second objects having each attribute being present in second image regions.

44. The surveillance system of claim 42 wherein the processing module further counts, for each of a predetermined number of earlier time instants, and for each of the plurality of attributes, the number of occurrences of both any one of the first and second objects having such attribute being currently present in the first image region and any one of the first and second objects having each attribute being present in the second image region at the earlier time instants.

45. A surveillance system comprising:
a) a first memory module for receiving first image data for a plurality of first video frames representing a first scene, wherein (i) each first video frame comprises a plurality of image regions and (ii) a first object is present in an image region of at least one first video frame;
b) a second memory module for receiving second image data for a plurality of second video frames representing a second scene, wherein (i) each second video frame comprises a plurality of image regions and (ii) a second object is present in an image region of at least one second video frame; and
c) a processing module for (i) determining a relationship between first and second image regions of the plurality of image regions of the first and second video frames based on a probabilistic correlation between occurrences of the first object being present in the first image region and occurrences of the second object being present in the second image region, (ii) determining that the first object present in one first video frame was not present in a preceding first video frame and (iii) correlating the first object with the second object present in the second video frames based on the determined relationship.

46. A surveillance system comprising:
a) a first memory module for receiving first image data for a plurality of first video frames representing a first scene, wherein (i) each first video frame comprises a plurality of image regions and (ii) a first object is present in an image region of at least one first video frame;
b) a second memory module for receiving second image data for a plurality of second video frames representing a second scene, wherein (i) each second video frame comprises a plurality of image regions, wherein each image region has a location in one of the plurality of first and second video frames that is substantially the same across the plurality of first and second video frames, and (ii) a second object is present in an image region of at least one second video frame; and
c) a processing module for determining a relationship between first and second image regions of the plurality of image regions of the first and second video frames based on a probabilistic correlation between occurrences of the first object being present in the first image region and occurrences of the second object being present in the second image region.

47. The surveillance system of claim 46 wherein the processing module further maintains an object list identifying at least the locations of the first object and the second object.

48. The surveillance system of claim 47 wherein the processing module further selects an object present in one of the first and second video frames and determines whether the selected object is one of the first object, the second object, and a third object based at least in part on the object list and the determined relationship.

* * * * *